United States Patent
Yamada et al.

(10) Patent No.: US 8,125,119 B2
(45) Date of Patent: Feb. 28, 2012

(54) PIEZOELECTRIC ACTUATOR CONTROL CIRCUIT, IMAGE STABILIZATION CONTROL CIRCUIT, AND IMAGING DEVICE

(75) Inventors: Yoshihisa Yamada, Inazawa (JP); Tomonori Kamiya, Ichinomiya (JP)

(73) Assignees: Sanyo Electric Co., Ltd., Moriguchi-shi (JP); Sanyo Semiconductor Co., Ltd., Ora-gun (JP)

( * ) Notice: Subject to any disclaimer, the term of this patent is extended or adjusted under 35 U.S.C. 154(b) by 285 days.

(21) Appl. No.: 12/314,661

(22) Filed: Dec. 15, 2008

(65) Prior Publication Data
US 2009/0152984 A1 Jun. 18, 2009

(30) Foreign Application Priority Data
Dec. 18, 2007 (JP) ................................. 2007-326114

(51) Int. Cl.
*H01L 41/09* (2006.01)
*H02N 2/06* (2006.01)
(52) U.S. Cl. ...................................... 310/317; 310/328
(58) Field of Classification Search .................. 310/317, 310/328
See application file for complete search history.

(56) References Cited

U.S. PATENT DOCUMENTS

| | | | | |
|---|---|---|---|---|
| 4,780,739 | A | * | 10/1988 | Kawakami et al. ............. 396/54 |
| 6,091,179 | A | * | 7/2000 | Tobe et al. ...................... 310/328 |
| 2004/0013420 | A1 | * | 1/2004 | Hara ................................ 396/55 |
| 2006/0082253 | A1 | * | 4/2006 | Hara ................................ 310/317 |
| 2006/0197410 | A1 | | 9/2006 | Fujinawa |
| 2009/0152985 | A1 | * | 6/2009 | Yamada et al. ................ 310/317 |

FOREIGN PATENT DOCUMENTS

JP A-2004-201405 7/2004

* cited by examiner

*Primary Examiner* — Derek Rosenau
(74) *Attorney, Agent, or Firm* — Oliff & Berridge, PLC (57) ABSTRACT

In a control circuit for servo control of a piezoelectric actuator, it is possible to efficiently move a movement object toward a target position in each servo control cycle. A pulse generation circuit (26) generates a drive pulse a plurality of times within a servo control cycle. The ideal value of the amount of movement in one drive pulse is stored in a register (28), and is used to estimate the amount of movement required to reach the target position of a lens (8) each time a drive pulse is generated. It is possible to switch between coarse movement and fine movement by using two types of drive pulses that have mutually different duty ratios, and the lens (8) can be rapidly moved by coarse movement when the required amount of movement is large, and fine movement when the required amount of movement is small.

14 Claims, 6 Drawing Sheets

PIEZOELECTRIC ACTUATOR CONTROL CIRCUIT, IMAGE STABILIZATION CONTROL CIRCUIT, AND IMAGING DEVICE

CROSS-REFERENCE TO RELATED APPLICATION

The priority application number JP 2007-326114 upon which this patent application is based is hereby incorporated by reference.

BACKGROUND OF THE INVENTION

1. Field of the Invention

The present invention relates to a control circuit for controlling the operation of an impact drive actuator in which a piezoelectric element is used; to an image stabilization control circuit for compensating for shaking of an imaging device using the control circuit; and to an imaging device that uses the image stabilization control circuit.

2. Description of the Related Art

Piezoelectric actuators that utilize the electrostriction effects of a piezoelectric element have conventionally been used for camera shake compensation, autofocus, and the like, for example.

An impact drive piezoelectric actuator has a drive shaft for retaining a movement object with the aid of friction, and the drive shaft is extended and retracted by a piezoelectric element. A drive circuit generates a voltage signal whereby the drive shaft has a different speed during extension and during retraction, i.e., a voltage signal whereby the drive shaft slowly extends and rapidly retracts, or does the opposite, and the drive circuit applies the voltage signal to the piezoelectric element. During rapid movement of the drive shaft, the movement object slides with respect to the drive shaft due to inertia and remains substantially in position. If the drive shaft is moved slowly, the position of the movement object is displaced along with the drive shaft by static friction. The movement object can by displaced in a specific direction with respect to the drive shaft by this extension and retraction.

This displacement can be achieved in principle by applying a voltage signal that has a jagged waveform having different rising times and falling times to the piezoelectric element. However, the drive signal outputted from the drive circuit need not necessarily have a jagged waveform, and it is known that the displacement described above can be obtained by adjusting the frequency or duty ratio even when the signal has a square waveform. The movement speed of the movement object is dependent on the frequency and duty ratio of the drive signal, and the moving direction can be varied by inverting the duty ratio, for example.

In servo control using an actuator, it is possible to follow to the target position with good precision by acquiring the newest position each time the actuator is driven and the object is displaced. However, the amount of displacement in one cycle of a piezoelectric actuator driven in accordance with a drive pulse is generally minute, and when a large amount of displacement is required, problems occur in that the target position is not approached closely enough by a single cycle of servo control.

The follow speed can be increased by reducing the length of the servo control cycle. However, the shortening of the servo control cycle is sometimes limited. In an image stabilization system in particular, the position of the lens or imaging element must be controlled in at least two dimensions, and a plurality of position sensors and angular speed sensors is used to detect the position and oscillation of the lens or the like. In order to reduce the size of the control circuit, an A/D converter is shared by time division to acquire the outputs of the plurality of sensors. In such a case, reduction of the servo control cycle length can be limited by the time division operation.

SUMMARY OF THE INVENTION

The present invention was developed in order to overcome the problems described above, and an object of the present invention is to provide a piezoelectric actuator control circuit that enables a movement subject to be suitably brought towards a target position by a piezoelectric actuator even when the length of the servo control cycle is limited.

The piezoelectric actuator control circuit of the present invention is a piezoelectric actuator control circuit for controlling displacement of an object by an actuator that uses a piezoelectric element, on the basis of an amount of displacement of the object obtained in each of a predetermined servo control cycle, and has a drive pulse generation unit for generating a drive pulse for displacing the object a predetermined step width, and outputting the drive pulse to the piezoelectric actuator; and a control unit for continuously generating the drive pulse a plurality of times within the servo control cycle.

DESCRIPTION OF THE PREFERRED EMBODIMENTS

Embodiments of the present invention (hereinafter referred to as embodiments) will be described hereinafter based on the drawings. In the present embodiment, the present invention is applied to a camera, and a piezoelectric actuator is used in an image stabilizing mechanism in the camera.

Figure 1:
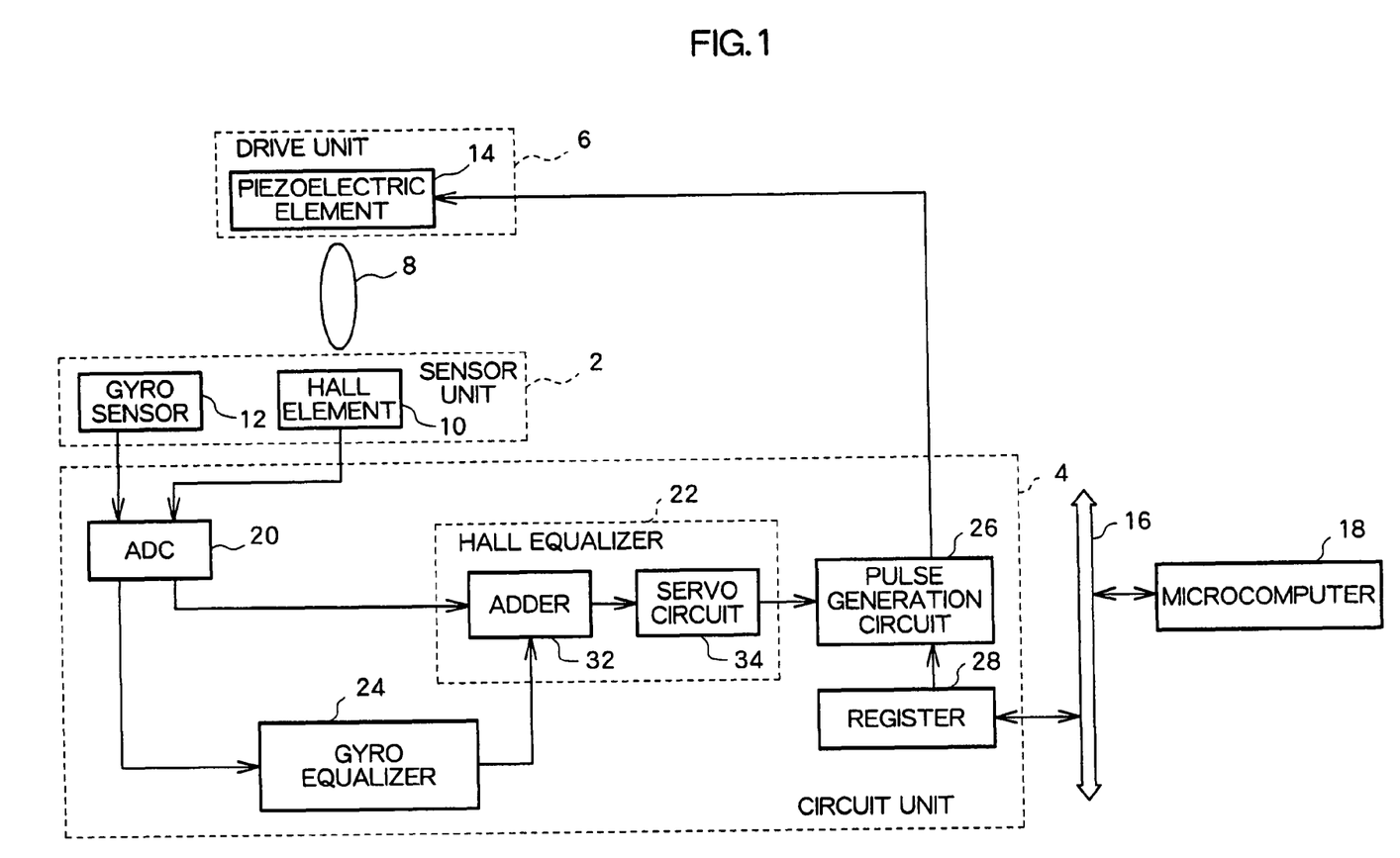
FIG. 1 is a schematic block diagram showing an image stabilizing system that uses a piezoelectric actuator according to an embodiment of the present invention.

FIG. 1 is a schematic block view showing an image stabilizing system that uses a piezoelectric actuator in the present camera. The image stabilizing system includes a sensor unit 2, a circuit unit 4, and a drive unit 6, and the circuit unit 4 is an image stabilization control circuit for controlling camera shake compensation. Several schemes are employed in image stabilizing systems, and a scheme may be adopted in the present system whereby the position of a lens 8 for forming an optical image on a light-receiving surface of an imaging element (not shown) is controlled.

The sensor unit 2 comprises a Hall element 10 and a gyro sensor 12. The Hall element 10 is a sensor provided to detect the position of the lens 8, and the Hall element 10 generates a voltage signal $V_P$ that is in accordance with the distance from the lens 8 on the basis of the magnetic field of a magnet fixed to the lens 8 and outputs the voltage signal $V_P$ to the circuit unit 4. In order to detect the two-dimensional position $(P_X, P_Y)$ of the lens 8 in the plane (x-y plane) perpendicular to the optical axis, a Hall element 10 is provided for each of the x direction and the y direction, and a signal $V_{PX}$ for the x direction and a signal $V_{PY}$ for the y direction are obtained as signals $V_P$.

The gyro sensor 12 is a sensor provided to detect vibration of the camera, and the gyro sensor 12 outputs a voltage signal $V_\omega$ that corresponds to the angular speed $\omega$ of the camera to the circuit unit 4. Two gyro sensors 12 are also provided, which detect the angular speed component $\omega_X$ about the x-axis and the angular speed component $\omega_Y$ about the y-axis, respectively, and output a signal $V_{\omega X}$ for $\omega_X$ and a signal $V_{\omega Y}$ of $\omega_Y$ as signals $V_\omega$.

The drive unit 6 is a piezoelectric actuator of the impact drive type described above, and is formed using a piezoelectric element 14. The piezoelectric element 14 to which a drive pulse signal generated by the circuit unit 4 is applied extends and retracts to cause a drive shaft to advance and retreat, and displaces the lens 8 retained on the drive shaft by friction in the direction of the drive shaft. A pair of actuators that include a piezoelectric element 14 and a drive shaft is provided in order to achieve displacement in two dimensions in the x-y plane, and displacement in the x direction and the y direction is possible.

The circuit unit 4 is connected to a microcomputer 18 via a system bus 16 or the like. The circuit unit 4 has an A/D converter (ADC: Analog-to-Digital Converter) 20, a Hall equalizer 22, a gyro equalizer 24, a pulse generation circuit 26, and a register 28. The circuit unit 4 comprises a logic circuit, and comprises an ASIC (Application-Specific Integrated Circuit), for example.

The output signals of the Hall element 10 and the gyro sensor 12 are each inputted to the ADC 20. The ADC 20 converts the voltage signals $V_{PX}$, $V_{PY}$ outputted by the two Hall elements 10, and the voltage signals $V_{\omega X}$, $V_{\omega Y}$ outputted by the two gyro sensors 12 by time division into digital data $D_{PX}$, $D_{PY}$, $D_{\omega X}$, $D_{\omega Y}$. The A/D conversion of each signal is performed periodically at each servo control cycle.

The position data $D_{PX}$, $D_{PY}$ generated based on the output of the Hall elements 10 are inputted to the Hall equalizer 22. The angular speed data $D_{\omega X}$, $D_{\omega Y}$ generated based on the output of the gyro sensor 12 are inputted to the gyro equalizer 24.

The gyro equalizer 24 performs integral processing of the angular speeds $D_{\omega X}$, $D_{\omega Y}$ inputted during a predetermined sampling period for each servo control cycle and generates data $D_{\theta X}$, $D_{\theta Y}$ that are in accordance with oscillation angles $\theta_X$, $\theta_Y$ of the camera about the x-axis and the y-axis, respectively. The gyro equalizer 24 generates and outputs, based on the data $D_{\theta X}$, $D_{\theta Y}$, vibration amount data $D_{SX}$, $D_{SY}$ that are in accordance with the amount of camera shake in the x direction and the y direction, respectively.

The Hall equalizer 22 has an adder 32 and a servo circuit 34. The adder 32 adds the position data $D_{PX}$, $D_{PY}$ inputted from the ADC 20 and the vibration amount data $D_{SX}$, $D_{SY}$ inputted from the gyro equalizer 24 separately for the x and y directions. The servo circuit 34 computes servo data $D_{SVX}$, $D_{SVY}$ that are required displacement amounts of the lens 8 from the output data $D_{AX}$, $D_{AY}$ of the adder 32.

The pulse generation circuit 26 generates a pulse for driving the piezoelectric element 14 on the basis of the servo data $D_{SVX}$, $D_{SVY}$ outputted from the Hall equalizer 22. The generated drive pulse signal is amplified to a voltage adequate for driving the piezoelectric element 14 and applied to the piezoelectric element 14. The pulse generation circuit 26 generates a pulse so that the drive unit 6 is driven in the direction in which the absolute values of $D_{SVX}$, $D_{SVY}$ decrease. A camera equipped with this system can thereby move the lens 8 in response to camera shake during the imaging period, compensate for displacement of the photographic subject image on the imaging element due to the camera shake, and obtain a high-quality image signal.

Figure 2:
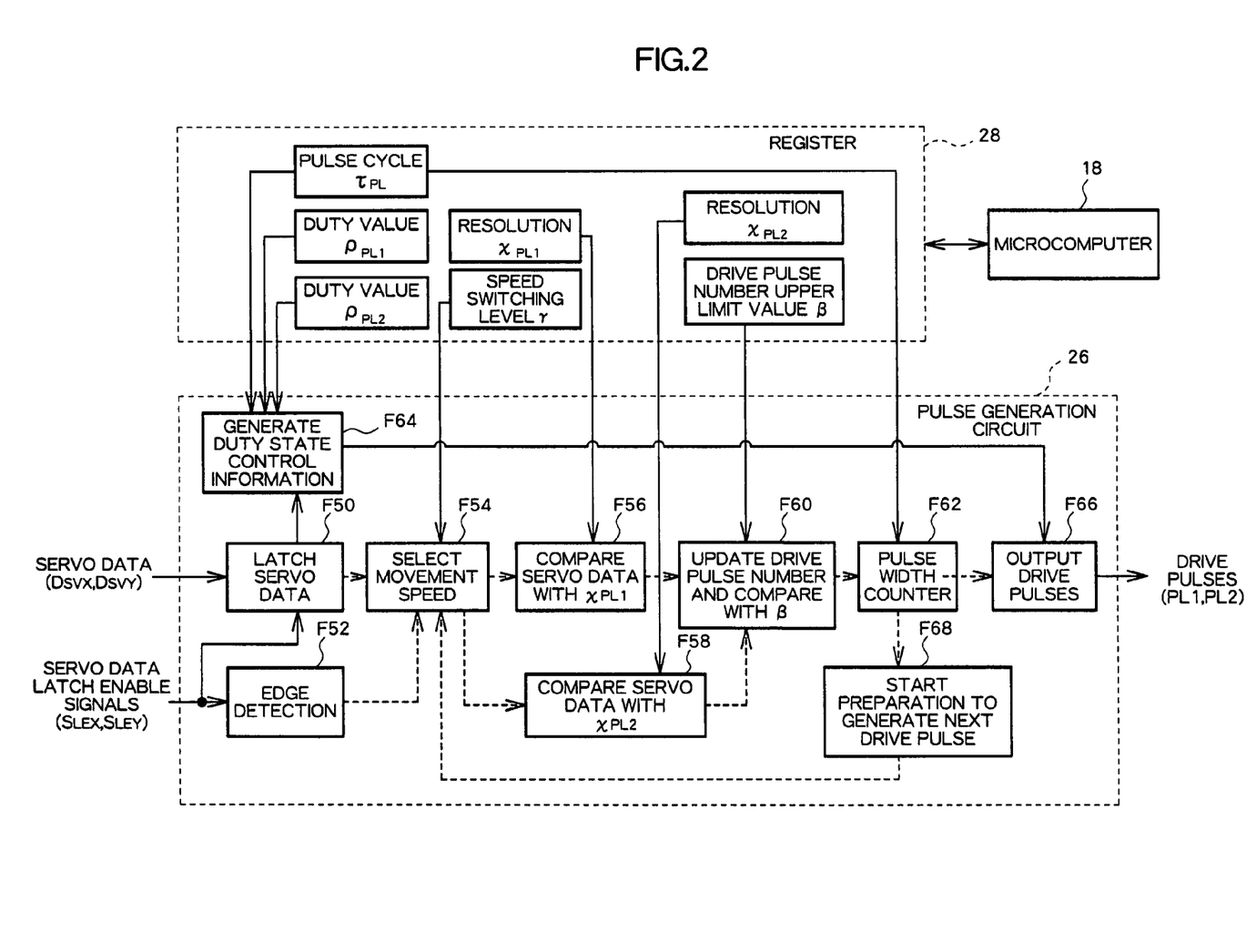
FIG. 2 is a schematic functional block diagram showing a pulse generation circuit.

FIG. 2 is a schematic functional block diagram showing the pulse generation circuit 26. The register 28 retains various types of user setting parameters used in processing by the pulse generation circuit 26. The writing and reading operations of the register 28 can be performed by the microcomputer 18 via the system bus 16. A user can perform a desired operation for the register 28 by causing the microcomputer 18 to execute a predetermined program.

The pulse generation circuit 26 in this arrangement can generate two types of drive pulses PL1, PL2 having different duty ratios. For example, in the register 28, a pulse cycle $\tau_{PL}$ of PL1, PL2, and duty values $\rho_{PL1}$, $\rho_{PL2}$ of PL1, PL2, respectively, are set as parameters for specifying the drive pulses PL1, PL2 of one cycle. The $\tau_{PL}$ can be defined by the number of cycles of a high-speed reference clock CLK that is fed to the pulse generation circuit 26, for example. The $\rho_{PL1}$, $\rho_{PL2}$ can be defined by the number of cycles of the clock CLK that are included in an H (High) level period of PL1, PL2 when the lens 8 is displaced in the positive directions of the x, y axes. Based on these settings, the pulse generation circuit 26 generates a pulse having the duty ratio ($\rho_{PL1}/\tau_{PL}$) in the case of displacement in the positive direction by PL1, and generates a pulse in which the time widths of the H level and the L (Low) level are reversed from that of displacement in the positive directions in the case of displacement in the negative directions, for example. Positive and negative duties are specified in the same manner for PL2 as well.

Generation of PL1, PL2 is switched according to the absolute value of the servo data. A speed switching level $\gamma$ is stored in the register 28 in advance as a threshold value for determining the size.

The lens 8 is displaced one step for each cycle of PL1, PL2. The displacement step width is the resolution with which the position of the lens 8 is controlled. Regarding this step width, an ideal value can be calculated through prior measurement or the like, and the ideal value is stored in the register 28 in advance as the resolution $\chi_{PL1}$, $\chi_{PL2}$ of PL1, PL2. In this instance, duty values $\rho_{PL1}$, $\rho_{PL2}$ are set so that the lens 8 can be moved faster by PL1 than by PL2, and $\chi_{PL1} > \chi_{PL2}$ according to this speed difference.

An upper limit value $\beta$ of the number of drive pulses generated in the servo control cycle may also be set in advance in the register 28.

Various types of parameters are thus stored in advance in the register 28. These parameters may be set separately for the x-axis and the y-axis. The pulse generation circuit 26 operates using each of these various parameters.

A servo data latch enable signal $S_{LE}$ generated in synchrony with the servo control cycle is inputted to the pulse generation circuit 26. When the signal $S_{LE}$ rises, the pulse generation circuit 26 performs an operation for latching the servo data outputted by the servo circuit 34 (F50). Since the circuit unit 4 performs x-direction servo control and y-direction servo control by time division, the signal $S_{LEX}$ for the x-direction and the signal $S_{LEY}$ for the y-direction are generated separately as signals $S_{LE}$ at mutually different timings. The circuit unit 4 acquires the output of the Hall element 10 and gyro sensor 12 in relation to the x-direction, for example, generates the servo data $D_{SVX}$, and outputs the $S_{LEX}$. The circuit unit 4 also acquires the output of the Hall element 10 and gyro sensor 12 in relation to the y-direction, generates the $D_{SVY}$, and outputs the $S_{LEY}$.

When the falling edges of the signals $S_{LEX}$, $S_{LEY}$ are detected in the pulse generation circuit 26 (F52), the pulse generation circuit 26 initiates the process from F54 to F66 for generating a drive pulse for the piezoelectric element 14.

The pulse generation circuit 26 compares the absolute values of the servo data $D_{SVX}$, $D_{SVY}$ with the predetermined speed switching level γ, determines according to the comparison results whether to generate any of PL1, PL2, and selects a movement speed (F54). The type of the selected pulse is set in a speed flag $F_{SP}$.

The pulse generation circuit 26 updates the servo data $D_{SVX}$, $D_{SVY}$ according to the displacement of the lens 8 by the drive pulse and controls generation of the drive pulse so that the servo data $D_{SVX}$, $D_{SVY}$ approach zero. Specifically, the pulse generation circuit 26 updates the servo data to values subsequent to drive pulse generation (F56, F58), using the resolution ($\chi_{PL1}$ or $\chi_{PL2}$) that corresponds to the drive pulse selected in process F54. A configuration may be adopted in which a drive pulse is not generated when the current servo data are less than the resolution (F56, F58).

The pulse generation circuit 26 counts the number of times that a drive pulse is generated in the servo control cycle, and stops outputting of the drive pulse when the generation count $n_{PL}$ exceeds an upper limit value β (F60).

A pulse width counter starts the count of the reference clock CLK in conjunction with the start of the generation of one cycle of drive pulses (F62). The timing of drive pulse generation and the like is controlled based on the count value $n_{CLK}$.

The positive/negative sign of the direction in which the lens 8 is to be moved is detected according to the sign of the latched servo data. The length of the H, L level, or the switching timing of the H, L level as control information of the duty state of one cycle of drive pulses is calculated as a number of cycles of the reference clock CLK from the sign and the pulse cycle $\tau_{PL}$ and duty value ($\rho_{PL1}$, $\rho_{PL2}$) stored in the register 28 (F64). The pulse generation circuit 26 generates and outputs a drive pulse on the basis of the reference clock CLK count value $n_{CLK}$ and the duty state control information for whichever of PL1, PL2 that is specified by the speed flag $F_{SP}$ (F66).

Preparation for generating a drive pulse is initiated slightly before $n_{CLK}$ reaches $\tau_{PL}$, so that the cycle of the next drive pulse can begin immediately following the end ($n_{CLK}=\tau_{PL}$) of the cycle of the drive pulse currently being outputted (F68).

Although the operation of the pulse generation circuit 26 that comprises an ASIC is substantially preset, the user can cause an actuator to operate according to a specific purpose by adjusting each type of parameter stored in the register 28. This configuration makes it possible to reduce the burden on the microcomputer and easily utilize a piezoelectric actuator in comparison to the conventional method in which a microcomputer controls the operation of the actuator using firmware for controlling a piezoelectric actuator.

Figure 3:
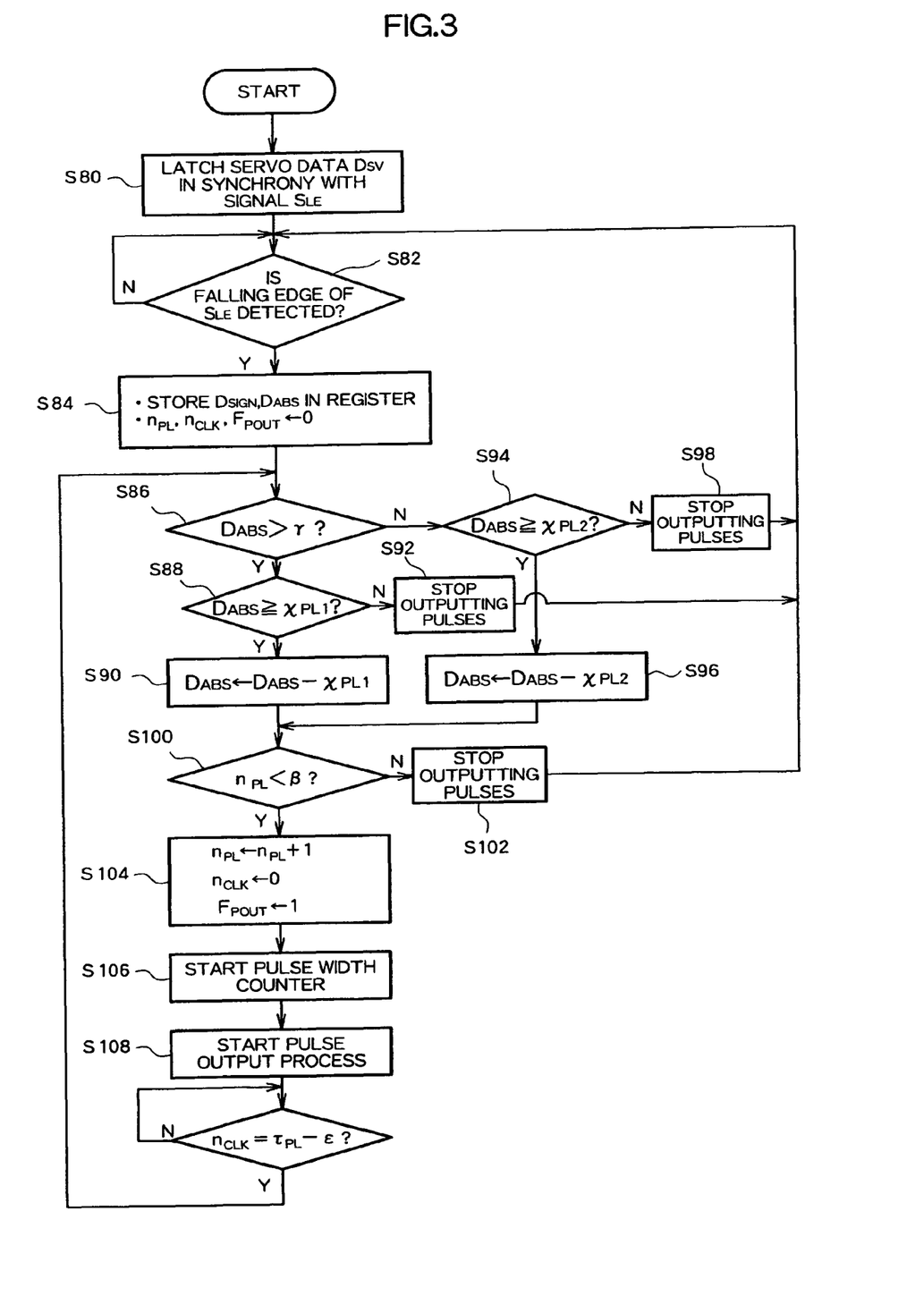
FIG. 3 is a schematic flow diagram showing the processing whereby the pulse generation circuit generates a drive pulse.

FIG. 3 is a schematic flow diagram showing the processing whereby the pulse generation circuit 26 generates a drive pulse. The servo data $D_{SV}$ ($D_{SVX}$, $D_{SVY}$) are latched in synchrony with the servo data latch enable signal $S_{LE}$ (S80; F50 of FIG. 2). When the pulse generation circuit 26 detects the falling of the $S_{LE}$ (S82; F52 of FIG. 2), the pulse generation circuit 26 stores the value $D_{SIGN}$ of the $D_{SV}$ sign bit, and the absolute value $D_{ABS}$ of the $D_{SV}$ in the register (S84). The count value $n_{PL}$ for the number of drive pulses that have been outputted, the count value $n_{CLK}$ of the pulse width counter, and the pulse output flag $F_{POUT}$ are reset to zero (S84).

The pulse generation circuit 26 compares the absolute value $D_{ABS}$ of the servo data with the speed switching level γ, and when $D_{ABS}>\gamma$, PL1 for producing a larger displacement (coarse movement) than PL2 is selected. When $D_{ABS}\leq\gamma$, PL2 for producing a smaller displacement (fine movement) than PL1 is selected. Specifically, the speed flag $F_{SP}$ is set according to this selection, $F_{SP}=1$ when $D_{ABS}>\gamma$, and $F_{SP}=0$ when $D_{ABS}\leq\gamma$ (S86; F54 of FIG. 2).

When $F_{SP}=1$, the $D_{ABS}$ is compared with the resolution $\chi_{PL1}$ (S88; F56 of FIG. 2). If $D_{ABS}\geq\chi_{PL1}$, since the $D_{ABS}$ can be brought closer to zero by generating the PL1, i.e., there is room for the lens 8 to be brought near the target position, the $D_{ABS}$ after generation is calculated assuming generation of the PL1 by the pulse generation circuit 26. Specifically, the $D_{ABS}$ is updated using the value obtained by subtracting $\chi_{PL1}$ from the current $D_{ABS}$ (S90). When $D_{ABS}<\chi_{PL1}$, since the lens 8 is displaced past the target position by generation of the PL1, outputting of drive pulses in the current servo control period is stopped (S92). Incidentally, γ is preferably set in a range in which $\gamma\geq\chi_{PL1}-1$ in order to prevent the output of drive pulses from being terminated in coarse movement control by PL1 before the lens 8 reaches the target position. It is thereby possible to basically transition to fine movement control by PL2 before ending with the coarse movement control, and to move the lens 8 to a position even closer to the target position.

When $F_{SP}=0$, $D_{ABS}$ is compared with the $\chi_{PL2}$ (S94; F58 of FIG. 2), whereby PL2 is generated, and a determination is made as to whether to move the lens 8. If $D_{ABS}\geq\chi_{PL2}$, generation of PL2 is assumed, and the $D_{ABS}$ after generation is calculated. Specifically, the $D_{ABS}$ is updated using the value obtained by subtracting $\chi_{PL2}$ from the current $D_{ABS}$ (S96). When $D_{ABS}<\chi_{PL2}$, outputting of drive pulses in the current servo control period is terminated (S98).

When $D_{ABS}\geq\chi_{PL1}$ or $D_{ABS}\geq\chi_{PL2}$ (S88, S94), there is room for PL1 or PL2 to be generated in relation to the $D_{ABS}$ as described above. In this case, a determination is furthermore made as to whether there is room to generate PL1 or PL2 in relation to the number of drive pulses in the servo control cycle (S100; F60 of FIG. 2). Specifically, if the count value $n_{PL}$ of pulses that have been outputted at the current time has reached the upper limit value β, i.e., if $n_{PL}\geq\beta$, the operation for outputting new drive pulses in the current servo control period is terminated (S102).

When $n_{PL}<\beta$, the process proceeds to the outputting process of PL1 or PL2. At the start of the pulse outputting process, the count value $n_{PL}$ of pulses that have been outputted is increased by one and updated, and the count value $n_{CLK}$ of the pulse width counter is reset to zero (S104). The pulse output flag $F_{POUT}$ is also set to one (S104). The pulse width counter is then started (S106). The pulse outputting process is started following the setting of the pulse output flag $F_{POUT}$ to one (S108). It is possible for the pulse width counter operation and the pulse outputting process to each be executed in the pulse generation circuit 26 concurrently with the preparation processes S86 through S102 prior to the drive pulse generation described above, and when the value $n_{CLK}$ of the pulse width counter reaches the value ($\tau_{PL}-\epsilon$) immediately prior to the end of counting, the preparation processes S86 through S102 for the subsequent drive pulse are initiated while generation of the current drive pulse is continued (S110; F68 of FIG. 2). The value of ε is set according to the time required for the preparation processes S86 through S102, and is set to about 2, for example. The pulse width counter counts the reference clock CLK, as described above.

In the pulse outputting process, drive pulse duty state control information is generated from the sign bit value $D_{SIGN}$, the speed flag $F_{SP}$, the duty values $\rho_{PL1}$, $\rho_{PL2}$, and the pulse cycle $\tau_{PL}$ (F64 of FIG. 2). The pulse generation circuit 26 switches between the H level and the L level of the output voltage on the basis of the $n_{CLK}$ and the control information for determining the duty, and generates and outputs a drive pulse.

Figure 4:
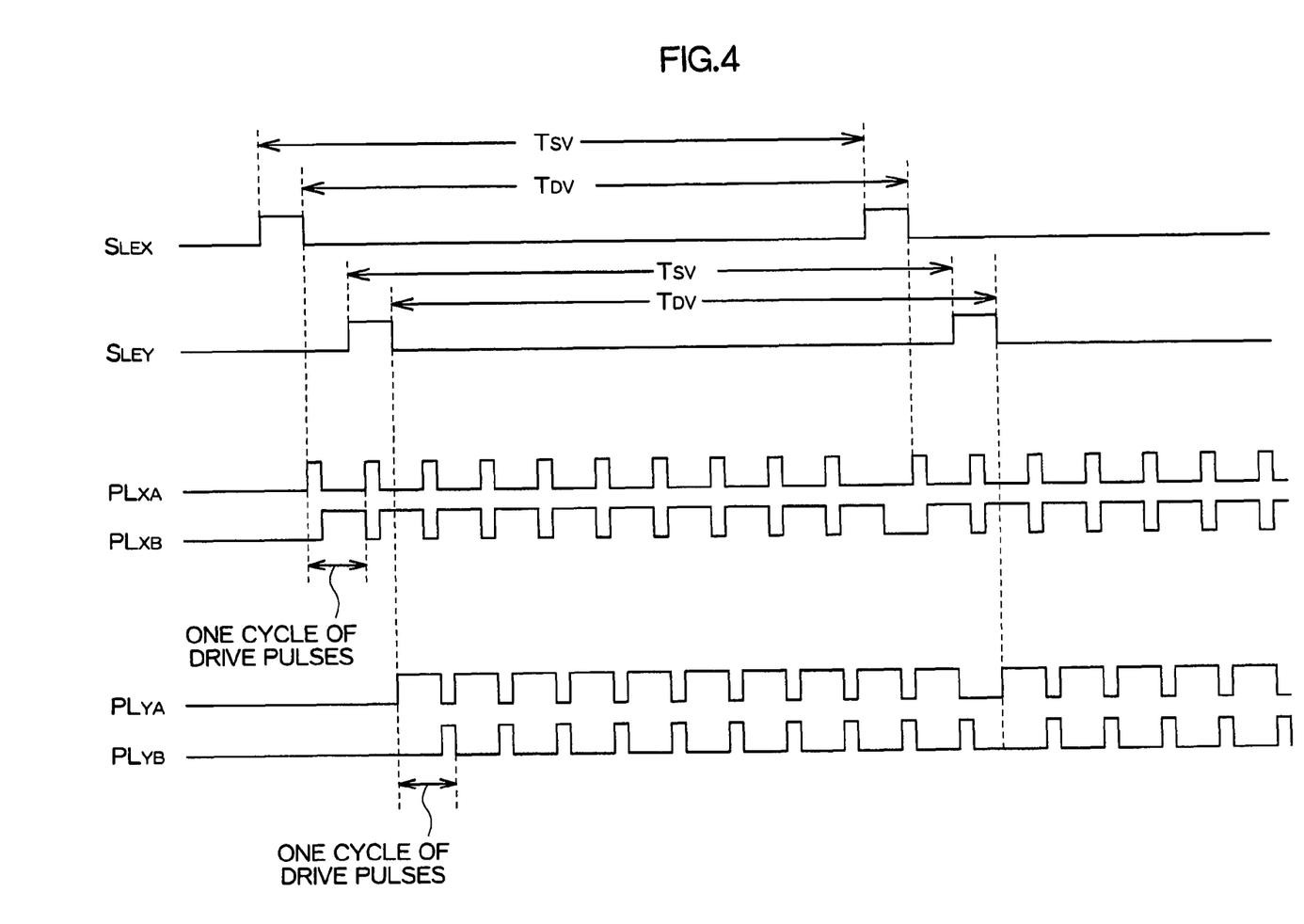
FIG. 4 is a schematic timing diagram showing the signal waveform of the drive pulses.

FIG. 4 is a schematic timing chart showing the signal waveform of the drive pulses. In FIG. 4, the time axis is in the horizontal direction, and the servo data latch enable signals $S_{LEX}$, $S_{LEY}$, the drive pulses $PL_{XA}$, $PL_{XB}$ for the x-direction piezoelectric actuator, and the drive pulses $PL_{YA}$, $PL_{YB}$ for the y-direction piezoelectric actuator are arranged and indicated in the vertical direction. The pulses $PL_{XA}$ and $PL_{XB}$ are applied to both poles, respectively, of the piezoelectric element 14 of the x-direction actuator, and are generated in complementary waveforms. In the same manner, $PL_{YA}$ and $PL_{YB}$ are pulses that are applied to both poles, respectively, of the piezoelectric element 14 of the y-direction actuator. For the x direction, for example, the servo control cycle $T_{SV}$ is the interval of the rising timing of $S_{LEX}$, and the drive pulses $PL_{XA}$, $PL_{XB}$ can be generated in the interval $T_{DV}$ of the falling timing of $S_{LEX}$. The upper limit value of the number of drive pulses generated in $T_{DV}$ is specified by $\beta$. The value of $\beta$ is set so as to satisfy $\beta \leq T_{DV}/(T_{CLK} \cdot T_{PL})$, wherein $T_{CLK}$ is the length of one cycle of the reference clock CLK. FIG. 4 shows an example in which $\beta=10$.

Figure 5:
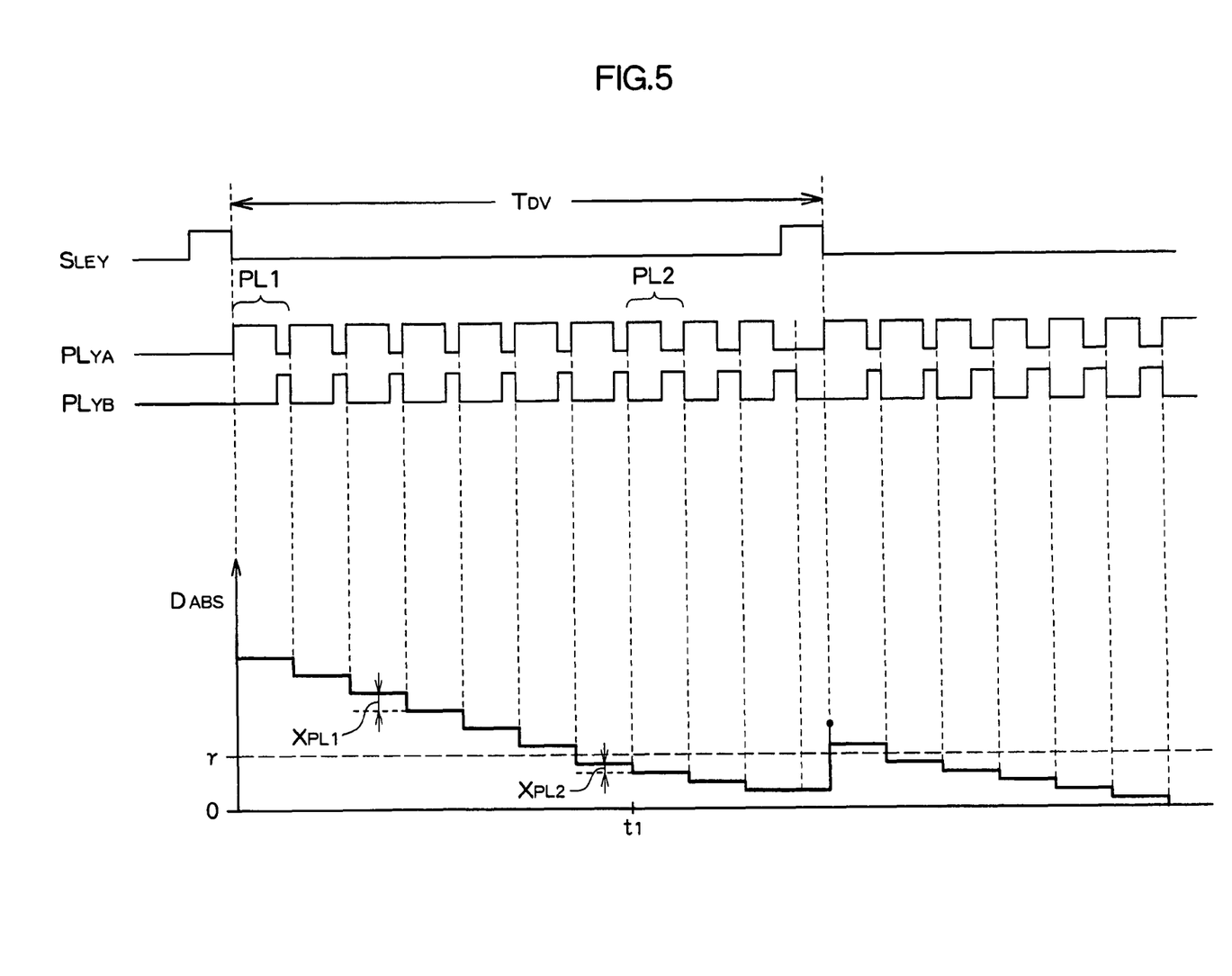
FIG. 5 is a schematic timing diagram showing an example of servo control using a piezoelectric actuator.

FIG. 5 is a schematic timing diagram showing an example of servo control using a piezoelectric actuator. In FIG. 5, the time axis is in the horizontal direction, and the servo data latch enable signal $S_{LEY}$, the drive pulses $PL_{YA}$, $PL_{YB}$, and the absolute value $D_{ABS}$ of the servo data $D_{SVY}$ are arranged and indicated in the vertical direction. This example is of a case in which the absolute value of $D_{SVY}$ latched in the falling of $S_{LEY}$ is a value that exceeds the speed switching level $\gamma$. The value of $D_{ABS}$ is reduced a predetermined step width each time a drive pulse occurs, and gradually approaches zero, which corresponds to the target position of the lens 8. At the start of driving, $D_{ABS}$ is larger than $\gamma$, and generation of the drive pulse PL1 is selected in process S86. The lens 8 is thereby displaced by a relatively large step width. This step width basically corresponds to the ideal value set in the register 28 as the resolution $\chi_{PL1}$, and $D_{ABS}$ is updated to a value that is less by an amount commensurate with $\chi_{PL1}$. Generation of the drive pulse PL1 is repeated while $D_{ABS}$ is larger than $\gamma$.

When $D_{ABS}$ is equal to or less than $\gamma$, generation of the drive pulse PL2 is selected in process S86, and the lens 8 is displaced by a step width smaller than that of PL1 (time $t_1$). The step width of PL2 basically corresponds to the ideal value set in the register 28 as the resolution $\chi_{PL2}$, and $D_{ABS}$ is updated to an amount that is less by an amount commensurate with $\chi_{PL2}$.

The pulse generation circuit 26 can thus switch between a coarse movement operation for displacing the lens 8 by a large step width by PL1, and a fine movement operation for displacing the lens 8 by a small step width by PL2. The lens 8 can thereby be made to rapidly approach the target position by a number of drive pulses that is limited within a period $T_{DV}$ that is in accordance with the servo control cycle by the coarse movement operation even when $D_{ABS}$ is large. Although the speed at which the target position is approached is reduced by the fine movement operation, suitable positional accuracy can be obtained.

In particular, the time taken to reach the target position can be shortened, and the accuracy of the position reached can be maintained at the same time by switching as $D_{ABS}$ gradually approaches zero so that coarse movement is performed while $D_{ABS}$ is in a large range, and fine movement is performed while $D_{ABS}$ is in a small range, as described above.

Figure 6:
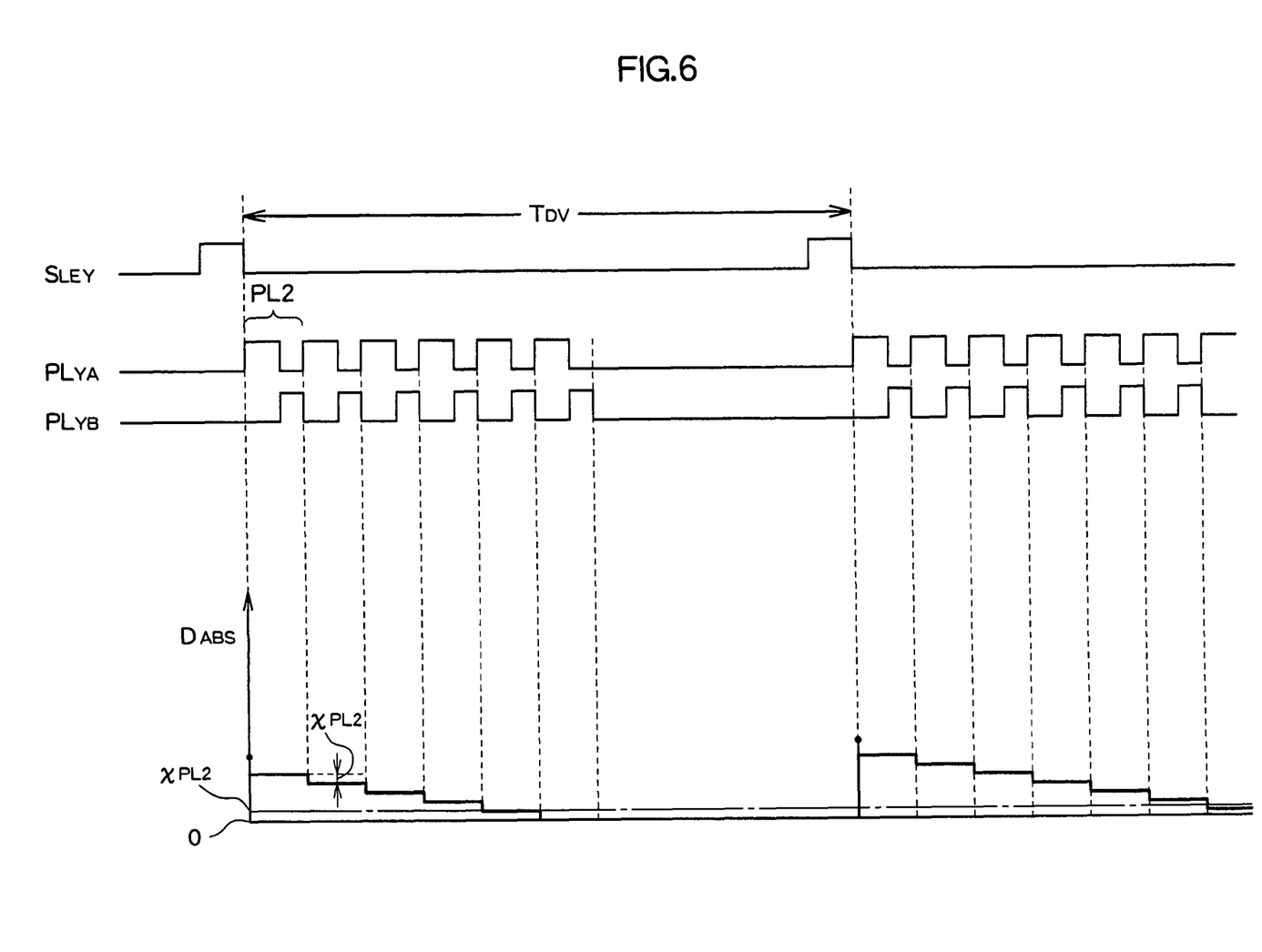
FIG. 6 is a schematic timing diagram showing another example of servo control using a piezoelectric actuator.

FIG. 6 is a schematic timing diagram showing another example of servo control using a piezoelectric actuator. In FIG. 6, the time axis is in the horizontal direction, and the servo data latch enable signal $S_{LEY}$, the drive pulses $PL_{YA}$, $PL_{YB}$, and the absolute value $D_{ABS}$ of the servo data $D_{SVY}$ are arranged and indicated in the vertical direction, the same as in FIG. 5. In this example, since the absolute value of $D_{SVY}$ latched in the falling of $S_{LEY}$ is relatively small, pulse output is stopped before the number of drive pulses reaches the upper limit value $\beta$. For example, since the $D_{ABS}$ is initially equal to or less than $\gamma$, the pulse generation circuit 26 initiates generation of drive pulses PL2 for fine movement. The $D_{ABS}$ is reduced by an amount commensurate with the resolution $\chi_{PL2}$ each time PL2 occurs. When the pulse generation circuit 26 detects that $D_{ABS}$ is less than $\chi_{PL2}$ (process S94 of FIG. 3), since the lens 8 would move past the target position if more drive pulses were to occur, drive pulse output is stopped (S98), and the current position that is estimated to be suitably close to the target position is maintained until the beginning of the next servo control cycle.

The present invention can also be used in an image stabilizing system for displacing an imaging element instead of a lens 8 through the use of a piezoelectric actuator. The embodiment described above relates to an image stabilizing system, but the present invention can be applied in general to a circuit for driving a piezoelectric actuator used in an autofocus or other servo control system.

A configuration was described in which it is possible to switch between two speed levels for coarse movement and fine movement using two types of drive pulses PL1, PL2 having different duty ratios, but a configuration may also be adopted in which information for defining even more duty states is stored in the register 28, and it is possible to switch between a larger number of speed levels.

The present invention makes it possible to generate a drive pulse a plurality of times within a servo control cycle in which the actual position or the like of the movement object is not observed, and to obtain a larger displacement than the small step width that corresponds to the amount of electrostriction of the piezoelectric element.

What is claimed is:

1. A piezoelectric actuator control circuit for controlling displacement of an object by a piezoelectric actuator that uses a piezoelectric element, on the basis of an amount of displacement of the object obtained in each of a predetermined servo control cycle;

the piezoelectric actuator control circuit comprising:
a drive pulse generation unit for generating a drive pulse for displacing the object by a predetermined step width, and outputting the drive pulse to the piezoelectric actuator;
a step width storage unit for storing an ideal value of a step width; and
a control unit for continuously generating the drive pulse a plurality of times within a current servo control cycle, wherein
the control unit estimates a residual amount of the displacement amount each time the drive pulse is generated, and stops generation of the drive pulse in the current servo control cycle when the residual amount becomes less than the ideal value, and
the residual amount of the displacement is estimated based upon a time division processing between an x component of a two-dimensional position of the object, a y component of the two-dimensional position of the object, an x component of a two-dimensional vibration of the object, and a y component of the two-dimensional vibration of the object.

2. The piezoelectric actuator control circuit according to claim 1, wherein
the step width storage unit comprises a register configured so that stored content can be rewritten; and
the drive pulse generation unit and the control unit comprise an ASIC.

3. The piezoelectric actuator control circuit according to claim 1, wherein
an x component of the residual amount of the displacement is estimated separately from a y component of the residual amount of the displacement based upon the time division processing.

4. A piezoelectric actuator control circuit for controlling displacement of an object by a piezoelectric actuator that uses a piezoelectric element, on the basis of an amount of displacement of the object obtained in each of a predetermined servo control cycle;
the piezoelectric actuator control circuit comprising:
a drive pulse generation unit for generating a drive pulse for displacing the object by a predetermined step width, and outputting the drive pulse to the piezoelectric actuator;
a duty storage unit for storing information for defining a first duty state having a large step width and a second duty state having a small step width, both step widths relating to a duty of the drive pulse;
a step width storage unit for storing an ideal value of a step width for each of the first and second duty states;
a switching level storage unit for storing a switching level that can be arbitrarily set; and
a control unit for continuously generating the drive pulse a plurality of times within a current servo control cycle, wherein
the drive pulse generation unit generates the drive pulse of the first or second duty state on the basis of information stored in the duty storage unit;
the control unit estimates the residual amount of the displacement amount each time the drive pulse is generated, and sets the generated drive pulse to the first duty state and displaces the object when the residual amount is larger than the switching level, and sets the second duty state and displaces the object when a residual amount is equal to or less than the switching level; and
the residual amount of the displacement is estimated based upon a time division processing between an x component of a two-dimensional position of the object, a y component of the two-dimensional position of the object, an x component of a two-dimensional vibration of the object, and a y component of the two-dimensional vibration of the object.

5. The piezoelectric actuator control circuit according to claim 4, wherein
the duty storage unit, the step width storage unit, and the switching level storage unit comprise registers configured so that stored content can be rewritten; and
the drive pulse generation unit and the control unit comprise an ASIC.

6. The piezoelectric actuator control circuit according to claim 4, wherein
an x component of the residual amount of the displacement is estimated separately from a y component of the residual amount of the displacement based upon the time division processing.

7. An image stabilization control circuit comprising:
a vibration compensation signal generation unit for generating, based on an output signal of a sensor for detecting a two-dimensional vibration of an imaging device, a vibration compensation signal that is in accordance with an amount of displacement of the imaging device by the two-dimensional vibration;
a lens control unit for generating a signal for controlling driving of a drivable lens in each of a predetermined servo control cycle on the basis of the vibration compensation signal and an output signal of a sensor for detecting a two-dimensional drive position of the lens of the imaging device; and
a piezoelectric actuator control circuit for controlling, based on an output signal of the lens control unit, displacement of the lens by a piezoelectric actuator in which a piezoelectric element is used; wherein
the piezoelectric actuator control circuit has:
a drive pulse generation unit for generating a drive pulse for displacing the lens by a predetermined step width, and outputting the drive pulse to the piezoelectric actuator;
a step width storage unit for storing an ideal value of a step width; and
a control unit for continuously generating the drive pulse a plurality of times within a current servo control cycle, wherein
the control unit estimates a residual amount of the displacement amount each time the drive pulse is generated, and stops generation of the drive pulse in the current servo control cycle when the residual amount becomes less than the ideal value; and
the residual amount of the displacement is estimated based upon a time division processing between an x component of the two-dimensional drive position of the object, a y component of the two-dimensional drive position of the object, an x component of the two-dimensional vibration of the object, and a y component of the two-dimensional vibration of the object.

8. An imaging device comprising the image stabilization control circuit according to claim 7.

9. The piezoelectric actuator control circuit according to claim 7, wherein
the step width storage unit comprises a register configured so that stored content can be rewritten; and
the drive pulse generation unit and the control unit comprise an ASIC.

10. The image stabilization control circuit according to claim 7, wherein
an x component of the residual amount of the displacement is estimated separately from a y component of the residual amount of the displacement based upon the time division processing.

11. An image stabilization control circuit comprising:
a vibration compensation signal generation unit for generating, based on an output signal of a sensor for detecting a two-dimensional vibration of an imaging device, a vibration compensation signal that is in accordance with an amount of displacement of the imaging device by the two-dimensional vibration;
a lens control unit for generating a signal for controlling driving of a drivable lens in each of a predetermined servo control cycle on the basis of the vibration compensation signal and an output signal of a sensor for detecting a two-dimensional drive position of the lens of the imaging device; and
a piezoelectric actuator control circuit for controlling, based on an output signal of the lens control unit, displacement of the lens by a piezoelectric actuator in which a piezoelectric element is used; wherein the piezoelectric actuator control circuit has:

a drive pulse generation unit for generating a drive pulse for displacing the lens by a predetermined step width, and outputting the drive pulse to the piezoelectric actuator;

a duty storage unit for storing information for defining a first duty state having a large step width and a second duty state having a small step width, both step widths relating to a duty of the drive pulse;

a step width storage unit for storing an ideal value of a step width for each of the first and second duty states;

a switching level storage unit for storing a switching level that can be arbitrarily set; and a control unit for continuously generating the drive pulse a plurality of times within a current servo control cycle, wherein the drive pulse generation unit generates the drive pulse of the first or second duty state on the basis of information stored in the duty storage unit;

the control unit estimates the residual amount of the displacement amount each time the drive pulse is generated, and sets the generated drive pulse to the first duty state and displaces the object when the residual amount is larger than the switching level, and sets the second duty state and displaces the object when a residual amount is equal to or less than the switching level; and the residual amount of the displacement is estimated based upon a time division processing between an x component of the two-dimensional drive position of the object, a y component of the two-dimensional drive position of the object, an x component of the two-dimensional vibration of the object, and a y component of the two-dimensional vibration of the object.

12. The piezoelectric actuator control circuit according to claim 11, wherein the duty storage unit, the step width storage unit, and the switching level storage unit comprise registers configured so that stored content can be rewritten; and the drive pulse generation unit and the control unit comprise an ASIC.

13. An imaging device comprising the image stabilization control circuit according to claim 11.

14. The image stabilization control circuit according to claim 11, wherein an x component of the residual amount of the displacement is estimated separately from a y component of the residual amount of the displacement based upon the time division processing.

* * * * *